Patented Oct. 28, 1952

2,615,879

UNITED STATES PATENT OFFICE 2,615,879

COPOLYMERS OF VINYLIDENE CYANIDE WITH ALPHA-SUBSTITUTED ESTERS OF ACRYLIC ACID

Vernon L. Folt, Akron, and Harry Gilbert, Cuyahoga Falls, Ohio, assignors to The B. F. Goodrich Company, New York, N. Y., a corporation of New York No Drawing. Application October 27, 1950, Serial No. 192,635

10 Claims. (Cl. 260—78.5)

This invention relates to the preparation of novel copolymers of vinylidene cyanide with alpha-substituted esters of acrylic acid, and pertains more particularly to copolymers of vinylidene cyanide with alkyl alpha-cyano acrylates and alkyl alpha-halo acrylates, which copolymers are extremely useful resinous materials.

In U. S. Patents 2,476,270 and 2,502,412, to Alan E. Ardis, and 2,514,387, to Harry Gilbert, novel methods for the preparation of monomeric vinylidene cyanide are disclosed. In a copending application, Serial No. 11,336, filed February 26, 1948, methods for the preparation of useful homo polymers of vinylidene cyanide are disclosed.

Monomeric vinylidene cyanide is a clear liquid at room temperature and a crystalline solid at 0° C., it melts in the range of 6.0° to 9.7° C. depending on purity, with purest samples melting at 9.0 to 9.7° C. and it boils at 40 C. at a reduced pressure of 5 mm. of mercury. It is quite unstable because of its extreme sensitivity to water, undergoing on contact with water at room temperature an instantaneous homopolymerization reaction to give a solid water-insoluble resin. When it is allowed to stand at room temperature in admixture with butadiene-1,3, it reacts therewith to give solid 4,4-dicyanocyclohexene.

It has now been discovered that monomeric vinylidene cyanide of the above physical and chemical properties will copolymerize with alkyl esters of acrylic acid in the presence of a free radical catalyst, regardless of the respective quantities of vinylidene cyanide and the alpha-substituted alkyl acrylate in the polymerization mixture.

The alpha-substituted alkyl esters of acrylic acid which are polymerized with vinylidene cyanide in accordance with the present invention possess the structure

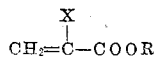

wherein X is a member of the class consisting of halogen atoms and cyano (—CN) groups and R is an alkyl radical. Included within this class of compounds are methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate, decyl alpha-cyano acrylate, and the like. The alpha-halo acrylates may be prepared by several different methods of synthesis known in the art; for example, one common method consists in reacting formaldehyde or a polymer thereof with a trihaloethylene in the presence of sulfuric acid of at least 80% concentration and heating the resulting mixture in the presence of water, a process disclosed in U. S. Patent 2,233,835. The alpha-cyano acrylates are prepared by the methods disclosed in U. S. Patents 2,467,926 and 2,467,927. The especially preferred compounds of the above general class are those in which the alkyl radical R is a lower alkyl radical, preferably containing from 1 to 4 carbon atoms. However, it is to be understood that the other alpha-substituted alkyl esters of acrylic acid disclosed hereinabove may also be polymerized with vinylidene cyanide with good results.

The polymerization may be carried out in several different ways. For example, one preferred method consists simply in heating a mixture of the monomers and the polymerization catalyst, without the use of a solvent or other liquid medium for the monomers, to effect the polymerization. The polymerization occurs readily at temperatures of about 20° C. to 100° C., the copolymer forming generally as a white, resinous powder of relatively small particle size.

A second method of polymerization consists in first dissolving the vinylidene cyanide and the alkyl alpha-cyano acrylate or the alkyl alpha-halo acrylate in benzene or other liquid aromatic solvent, such as toluene, methyl toluene, trichloro benzene or the like, preferably free from impurities which initiate the ionic polymerization of the monomer and in an amount such that the solvent comprises approximately 30% to 80% by weight of the total solution. A polymerization catalyst is included in the solution and the resulting solution is maintained at the desired temperature, whereupon polymerization occurs to form the desired copolymer. The copolymer thus formed may be separated from the polymerization medium simply by filtering, or, if desired, the solvent may be removed by an evaporation process. Also, the polymerization may be effected at temperatures as low as 0° C. or lower, or as high as 100° C. or even higher, providing a catalyst is utilized which will dissociate into free radicals at the polymerization temperature.

The respective quantities of the alkyl acrylate and vinylidene cyanide in any polymerization charge are not critical since a useful copolymer is obtained regardless of the amount of either monomer in the charge, as will be demonstrated in the examples hereinbelow. The amount of vinylidene cyanide in the monomer charge may be as low as 0.1 mole per cent or as high as 99 mole per cent while obtaining copolymers markedly different from straight homopolymers of either the alpha-substituted acrylic acid ester or the vinylidene cyanide.

It is to be understood, of course, that regardless of the polymerization method utilized, the polymerization should be stopped before either of the monomers is entirely consumed, in order that true copolymer will be obtained. Otherwise, when either of the monomers is completely used up, the product will contain straight polymer obtained by the polymerization of the remaining monomer. Accordingly, it is often desirable to add, continuously or intermittently, fresh quantities of one or both of the monomers, and also of catalyst and solvent if desired, to the polymerization mixture during the course of the polymerization, thus taking fullest advantage of the capacity of the equipment and in effect operating a continuous or semi-continuous process.

The catalyst which is utilized in the polymerization process is preferably a peroxygen compound, such as silver peroxide, the perborates, the percarbonates, benzoyl peroxide, caproyl peroxide, lauroyl peroxide, acetone peroxide, acetyl benzoyl peroxide, cumene hydroperoxide, o,o'-dichlorobenzoyl peroxide, o,o'-dibromobenzoyl peroxide, caprylyl peroxide, pelargonyl peroxide, tertiary butyl hydroperoxide, tetralin peroxide, and the like. In general, from 0.01 to about 2% by weight of the catalyst, based on the weight of the monomers, is utilized, although smaller or larger amounts may be utilized if desired.

The following examples illustrate the preparation of copolymers of vinylidene cyanide with alkyl alpha-cyano acrylates and alkyl alpha-halo acrylates in accordance with this invention, but are not to be construed as a limitation upon the scope thereof, for there are, of course, numerous possible variations and modifications.

EXAMPLES I TO X

A series of 10 vinylidene cyanide:methyl alpha-chloroacrylate copolymers is prepared by mixing varying amounts of both monomers with about 0.15% (based on the total weight of the monomers) of o,o'-dichlorobenzoyl peroxide and maintaining the resulting mixture at a temperature of 50° C. in an air atmosphere for a period of time varying from ¾ hour to about 7 hours. The solid, resinous copolymer obtained at the end of this period is then analyzed to determine its composition. The mole per cent vinylidene cyanide in the polymerization charge, the polymerization time, the per cent conversion, the per cent nitrogen in the copolymer and the mole per cent vinylidene cyanide in the copolymer are recorded in the following table:

and copolymerized by heating the mixture to a temperature 40 C. in the presence of 0.15% of o,o'-dibromobenzoyl peroxide for a period of 3 hours. A hard, resinous copolymer containing approximately 40 mole per cent vinylidene cyanide is obtained. When other alkyl alpha-halo acrylates and alkyl alpha-cyano acrylates are substituted for the compounds of the above examples, solid, resinous copolymers are again obtained. Likewise, when the polymerization is carried out according to other of the methods disclosed hereinabove or utilizing other of the peroxygen catalysts disclosed, excellent results are achieved.

As disclosed hereinabove, the copolymers of the present invention are extremely useful resinous materials. For example, the copolymers of Examples I to X inclusive possess softening temperatures in the range of 179° C. to 203° C., this property rendering them of considerable value in the melt spinning of useful filaments and in the preparation of films and molded articles. Moreover, the copolymers of the present invention generally possess the advantageous property of being extremely insensitive to the action of alkalis and acids. Straight homopolymers of vinylidene cyanide, on the other hand, tend to be alkali sensitive and possess no marked softening points and are not desirably melt spun or cast. Thus, it is readily apparent that many desirable properties are obtained by polymerizing vinylidene cyanide with alpha-substituted alkyl acrylates, according to the method of this invention.

Although specific examples of the invention have been herein described, it is not intended to limit the invention solely thereto, but to include all of the variations and modifications falling within the spirit and scope of the appended claims.

We claim:

1. A two component copolymer of monomeric vinylidene cyanide and a compound of the structure

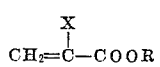

wherein X is a member of the class consisting of halogen atoms and cyano groups and R is an alkyl radical, the monomeric vinylidene cyanide entering into said copolymer to produce the vinylidene cyanide units therein being a liquid at room temperature and a crystalline at 0° C. having a melting point when in purest form of substantially 9.0° C. to 9.7° C. and being characterizable chemically by the ability to undergo on contact with water at room temperature an instantaneous homopolymerization reaction to give a solid, water-insoluble

*Table I*

| Example | Mole Percent Vinylidene Cyanide in Polymerization Charge | Time (Minutes) | Percent Conversion | Percent Nitrogen in Copolymer | Mole Percent Vinylidene Cyanide In Copolymer |
|---|---|---|---|---|---|
| I | 3.05 | 45 | 5.16 | 2.05 | 8.56 |
| II | 3.05 | 45 | 4.04 | 2.27 | 9.43 |
| III | 7.52 | 75 | 8.40 | 4.31 | 17.43 |
| IV | 14.65 | 75 | 7.20 | 6.33 | 24.89 |
| V | 14.65 | 75 |  | 6.47 | 25.38 |
| VI | 21.42 | 75 | 9.30 | 8.02 | 30.72 |
| VII | 34.00 | 75 | 9.45 | 9.45 | 35.58 |
| VIII | 60.67 | 90 | 7.30 | 13.21 | 37.38 |
| IX | 81.62 | 165 | 4.90 | 17.40 | 59.24 |
| X | 93.22 | 405 |  | 19.72 | 65.92 |

EXAMPLE XI

One mole of vinylidene cyanide and one mole of methyl alpha-cyano acrylate are admixed resin and by the ability to react at room temperature with butadiene-1,3 to give solid 4,4-dicyanocyclohexene.

2. The copolymer of claim 1 wherein X is a halogen atom and R is an alkyl radical.

3. The copolymer of claim 1 wherein X is a cyano group and R is an alkyl radical.

4. The copolymer of claim 2 wherein the compound of the structure

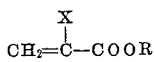

is methyl alpha-chloro acrylate.

5. The copolymer of claim 3 wherein the compound of the structure

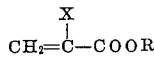

is methyl alpha-cyano acrylate.

6. The method which comprises admixing liquid monomeric vinylidene cyanide, said monomeric vinylidene cyanide being characterizable chemically by the ability to undergo on contact with water at room temperature an instantaneous homopolymerization reaction to give a solid, water-insoluble resin and by the ability to react at room temperature with butadiene-1,3 to give solid 4,4-dicyanocyclohexene, with a compound of the structure

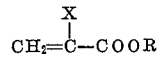

wherein X is a member of the class consisting of halogen atoms and cyano groups and R is an alkyl radical, and with a peroxygen catalyst, and maintaining the resulting mixture at a temperature of from 0° C. to 100° C. thereby to form a solid resinous, two component copolymer of vinylidene cyanide with said compound of the structure

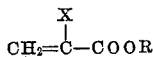

7. The method of claim 6 wherein X is a halogen atom.

8. The method of claim 6 wherein X is a cyano group.

9. The method of claim 7 wherein the compound of the structure

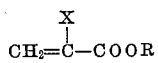

is methyl alpha-chloroacrylate and the peroxygen catalyst is o,o'-dichlorobenzoyl peroxide.

10. The method of claim 8 wherein the compound of the structure

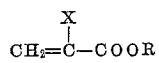

is methyl alpha-cyano acrylate and the peroxygen catalyst is o,o'-dibromobenzoyl peroxide.

VERNON L. FOLT.
HARRY GILBERT.

REFERENCES CITED

The following references are of record in the file of this patent:

UNITED STATES PATENTS

| Number | Name | Date |
| --- | --- | --- |
| 2,396,785 | Hanford | Mar. 19, 1946 |
| 2,436,926 | Jacobson | Mar. 2, 1948 |
| 2,466,395 | Dickey | Apr. 5, 1949 |